(12) United States Patent
Cohen et al.

(10) Patent No.: US 8,706,782 B2
(45) Date of Patent: Apr. 22, 2014

(54) SELF-CONTAINED PLACEMENT OF DATA OBJECTS IN A DATA STORAGE SYSTEM

(75) Inventors: Simona Cohen, Haifa (IL); Avraham Harpaz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 13/158,421

(22) Filed: Jun. 12, 2011

(65) Prior Publication Data

US 2012/0316846 A1 Dec. 13, 2012

(51) Int. Cl.
*G06F 17/30* (2006.01)

(52) U.S. Cl.
USPC .......................................... 707/812; 711/159

(58) Field of Classification Search
USPC ............ 707/1/1, 626, 737, 741, 688; 711/159
See application file for complete search history.

(56) References Cited

U.S. PATENT DOCUMENTS

| | | | |
|---|---|---|---|
| 5,875,446 A * | 2/1999 | Brown et al. ......................... | 1/1 |
| 6,615,204 B1 * | 9/2003 | Menon ................... | 1/1 |
| 7,523,117 B2 | 4/2009 | Zhang et al. | |
| 7,716,180 B2 * | 5/2010 | Vermeulen et al. ........... | 707/626 |
| 7,778,972 B1 * | 8/2010 | Cormie et al. ................ | 707/626 |
| 7,788,210 B2 | 8/2010 | Lang et al. | |
| 2005/0097283 A1 * | 5/2005 | Karlsson et al. .............. | 711/159 |
| 2008/0275902 A1 | 11/2008 | Burges et al. | |
| 2009/0106234 A1 | 4/2009 | Siedlecki et al. | |
| 2009/0192867 A1 * | 7/2009 | Farooq et al. .................... | 705/10 |
| 2011/0178953 A1 * | 7/2011 | Johannes .................... | 705/36 R |
| 2012/0010772 A1 * | 1/2012 | Pack et al. ....................... | 701/27 |
| 2012/0016878 A1 * | 1/2012 | Peng ............................. | 707/737 |
| 2012/0303740 A1 * | 11/2012 | Ferris ........................... | 709/217 |

OTHER PUBLICATIONS

Sangchul Song and Joseph JaJa, "Web Archiving: Organizing Web Objects Into Web Containers to Optimize Access", Technical Report UMIACS-TR-2007-42.
Ei-Ghazali Talbi and Pierre Bessiere, "A Parallel Genetic Algorithm for the Graph Partitioning Problem", 1991.
Vlad S. I. Wietrzyk, Mehmet A. Orgun, "Clustering Techniques for Minimizing Object Access Time".

* cited by examiner

*Primary Examiner* — James Trujillo
*Assistant Examiner* — Thong Vu
(74) *Attorney, Agent, or Firm* — F. Jason Farhadin, Esq.; Century IP Group

(57) ABSTRACT

Systems and methods for optimal data storage are provided. The method comprises storing data objects that are most closely related in a storage container by modeling a constraint satisfaction problem for placement of said data objects in one or more storage containers, wherein a weight is assigned to an edge connecting two data objects based on an association defining relationships between the two data objects connected by said edge, taking into account certain penalties for placing multiple copies of the same object in the one or more storage containers, and wherein a storage container comprises a logical or physical storage area as a unit of storage.

21 Claims, 6 Drawing Sheets

| Coefficients | Definitions |
|---|---|
| $K$ | The number of required partitions in the graph i.e. number of storage containers. |
| $uv_i$ | The directed edge (link) between nodes (objects) u and v in storage container i. |
| $w(uv_i)$ | The weight (importance) of the directed edge (link) from u to v in storage container i. This is a function of the parameters described earlier. It may have different values in different storage containers. Note that $w(uv_i)$ may differ from $w(vu_i)$. |
| $p(u)$ | A penalty for using a copy of node (object) u. It should be proportional to the size of u but much smaller than w(uv) for all edges connected to u. It has the same value no matter in what storage container the node resides. |
| $s(u)$ | The size in bytes of node (object) u. It has the same value no matter in what storage container the node resides. |
| $SC_i$ | The size in bytes of storage container i. |
| $u_L$ | The number of maximum allowed copies for object u. | variables $$x(uv_i) = \begin{cases} 1 & \text{if the edge uv is selected in storage container i} \\ 0 & \text{otherwise} \end{cases}$$

$$y(u_i) = \begin{cases} 1 & \text{if node u is selected in storage container i} \\ 0 & \text{otherwise} \end{cases}$$

objective function: maximize $\sum_{i=1}^{K} \sum_{\forall u, v \in V} [w(uv_i) x(uv_i) - p(u) y(u_i) - p(v) y(v_i)]$ subject to:

(1) $\sum_{\forall u \in V} s(u) y(u_i) \leq SC_i \quad \text{for } i=1,\ldots,K$ (2) $\sum_{i=1}^{K} x(uv_i) \leq 1 \quad \text{for all } u, v \in V \quad \text{for which w(uv)>0}$ (3) $2 x(uv_i) - y(u_i) - y(v_i) \leq 0 \quad \begin{array}{l}\text{for i=1,\ldots,K and} \\ \text{for all } u, v \in V\end{array}$ (4) $1 \leq \sum_{i=1}^{K} y(u_i) \leq u_L \quad \text{for all } u \in V$ (5) $x(uv_i), y(u_i) \in \{0,1\} \quad \begin{array}{l}\text{for i=1,\ldots,K and} \\ \text{for all } u, v \in V\end{array}$

*FIG. 2A*

| Coefficients | Definitions |
|---|---|
| $K$ | The number of required partitions in the graph i.e. number of storage containers. |
| $uv_i$ | The directed edge (link) between nodes (objects) u and v in storage container i. |
| $w(uv)$ | The weight (importance) of the directed edge (link) from u to v in storage container i. This is a function of the parameters described earlier. It may have different values in different storage containers. Note that $w(uv_i)$ may differ from $w(vu_i)$. |
| $p(u)$ | A penalty for using a copy of node (object) u. It should be proportional to the size of u but much smaller than w(uv) for all edges connected to u. It has the same value no matter in what storage container the node resides. |
| $s(u)$ | The size in bytes of node (object) u. It has the same value no matter in what storage container the node resides. |
| $SC_i$ | The size in bytes of storage container i. |
| $u_L$ | The number of maximum allowed copies for object u. |

*FIG. 2B*

Variable $$x_j(uv_i) = \begin{cases} 1 & \text{if there is a directed path of length } j \text{ in storage container } i \\ 0 & \text{otherwise} \end{cases}$$

Coefficient $w_j(uv_i)$ = a function of the weights on the edges in the path plus a factor that decreases the weight as the path gets longer.

Objective function maximize $\sum_{i=1}^{K} \sum_{j=1}^{M} [\sum_{j \neq v \wedge A \models 1} w_j(uv_i)x_j(uv_i) - p(u)y(u) - p(v)y(v)]$ Subject to:

(2)  $\sum_{i=1}^{K} \sum_{j=1}^{M} x_j(uv) \leq 1$  for all $u,v \in V$  for which $w_j(uv) > 0$ (3.1)  $2x_1(uv) - y(u) - y(v) \leq 0$   for $i=1,...,K$ and for all $u,v \in V$ (3.2)  $3x_2(uv) - y(u) - y(w_i^1) - y(v) \leq 0$   for $i=1,...,K$ and for all $u,v \in V$

⋮

(3.M)  $(M+1)x_M(uv) - y(u) - y(w_i^1) - ... - y(w^{M-1}_i) - y(v) \leq 0$

*FIG. 3*

SELF-CONTAINED PLACEMENT OF DATA OBJECTS IN A DATA STORAGE SYSTEM

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to self-contained placement of data objects in a data storage system and, more particularly, to a system and method for optimizing placement of data objects in a distributed data storage environment.

BACKGROUND

Data storage systems are configured for storing, managing and accessing large amounts of data. In a data archive system, particularly, the data may be stored for long periods of time. The data can include documents which have been selected for permanent or long-term digital preservation. The duration of the data may be defined according to data's enduring value or regulatory requirements.

A core artifact maintained in an archive system is an archive object (AO). An AO includes a raw content data object (CDO) that is archived along with metadata used for describing that CDO. Some metadata are used to ensure that the CDO is uniquely identifiable, to describe its provenance and context, and to determine if the data has been altered in an undocumented manner. Some of the metadata resides in storage models or structures that are suitable for fast access (e.g., a database or extended attributes of a file system).

Often associations and relationships exist among various AOs. As an example, in an email, there are threads that include attachments. If each thread and each attachment is stored as a separate AO, the AOs that originated from the same email are associated. In general, the associated (or related) AOs do not necessarily reside on the same storage media or storage container, and this has disadvantages. For example, if related data lacks self-containment (i.e., if the related data is not stored in the same storage container), the access time is not optimized because the data will have to be read by way of several requests submitted to different storage media or devices. If, for some reason, one or more of such media is off-line, then the access delay is even further exacerbated.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, systems and methods for optimal data storage are provided. The method comprises storing data objects that are most closely related in a storage container by modeling a constraint satisfaction problem for placement of said data objects in one or more storage containers, wherein a weight is assigned to an edge connecting two data objects based on an association defining relationships between the two data objects connected by said edge, taking into account certain penalties for placing multiple copies of the same object in the one or more storage containers, and wherein a storage container comprises a logical or physical storage area as a unit of storage.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

FIGS. 2A, 2B and 3 represent models for optimizing placement of data objects in a number of containers, in accordance with one embodiment.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

Figure 1:
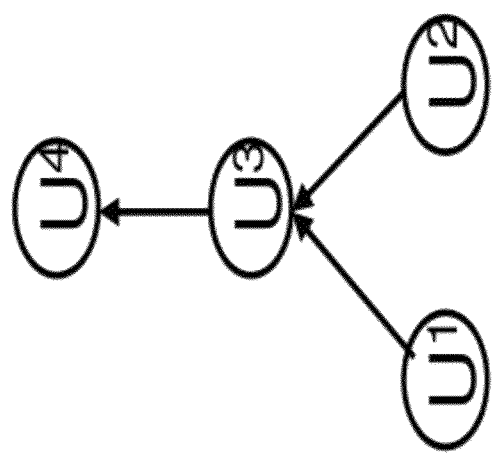
FIG. 1 illustrates an exemplary set of data objects with directed links connecting the data objects, where each link defines a relationship in accordance with one or more embodiments.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, known relationships between objects (and copies of such objects) are utilized to optimize the placement of the objects in a distributed environment. The objects may be data objects (e.g., files, records, documents, etc.) that are to be stored in data storage mediums. In some embodiments, the objects may be resources (e.g., virtual machines, computation modules, etc.) that are to be placed on host systems or networks. In yet other embodiments, the objects may include entities with a user relationship with other data objects or resources, or any other scenario in which one or more types of relationships between objects may be defined.

As a preliminary example, assume data objects with a defined relationship that are to be stored on storage container with the objective of enhancing access or retrieval rates associated with each object, taking into account other constraints such as the need for redundancy to preserve availability and data integrity in case of data corruption or data loss. By way of example, a relationship between objects "u" and "v" that are connected by an edge may be represented by a vector "u⇒v" in which "uv" identifies a one-way relationship (i.e., a directed edge) from u to v.

In one embodiment, it would be desirable to implement a method to store objects that are most closely related in the same storage container or as closely as possible (e.g., in the same storage device). This method may be modeled by way of a linear constraint satisfaction problem, where a weight is assigned to an edge connecting two objects based on the association (relationship) of the objects connected by that edge, taking into account certain penalties for placing multiple copies of the same object.

In one embodiment, the above scheme may be extended to cover a path (in contrast to an edge), wherein an object included in a path has more than a one-to-one relationship with another object. That is, a path is used to identify a directed relationship between multiple objects instead of just two objects, where for example "uvw" represents a path covering related objects starting from u to v and ending with w. This extended scenario may be modeled based on a linear constraint satisfaction problem, where $X_j(UV_i)$ represents a path of length "j" between objects U and V in a storage container i.

The output of the solver that solves the above constraint satisfaction problem provides information about the objects that are to be placed in one or more storage containers. A storage container, depending on implementation, may comprise a logical or physical storage area considered as a unit. For example, a storage container may comprise a mountable data storage unit, a file system, a tape, a block device, a stream device, an object store, a data bucket in a cloud storage, or a functional or structural equivalent. In one embodiment, variable $x(UV_i)$ is a Boolean variable that indicates whether an edge UV is included in a storage container i; and variable $y(U_i)$ is a Boolean variable that indicates whether an object U is included in a storage container i.

The result of the solver, depending on implementation, may include multiple sets where each set represents a container and the values included in that set represent the objects (or copies of objects) that are to be placed therein. This result may be used to rearrange the data storage placement for the objects in a data storage system so as to optimize data access and retrieval with possible improvements in data security and fault tolerance.

Three placement configuration may be implemented in accordance with one or more embodiments:

Offline placement which involves analyzing data previously placed in multiple containers and using a placement model such as that referred to above to rearrange the placement of the data objects in the most optimal way based on the identified constraints.

Online placement which involves making the most optimal placement possible once receiving new objects, without changing the placement of objects that have been already stored and leaving it to a later time to perform an offline placement on some or all the data objects placed in the containers.

Semi-Online placement which involves making the most optimal placement possible when new objects are received, preferably without changing the placement of objects that have been already placed, other than instances when changing the placement of some objects is highly desirable.

In the above discussion, a general conceptual implementation of the claimed subject matter is provided. In the following, example embodiments with additional details are discussed without the intention of limiting the scope of the claimed subject matter to said specific embodiments or details. The exemplary embodiments below are implemented based on the understanding that finding an optimal self-contained placement for documents stored in a data storage system is NP-hard (non-deterministic polynomial-time hard).

NP-hard, in computational complexity theory, is a class of problems that are, informally, at least as hard as the hardest problems in the NP. That is, a problem H is considered to be NP-hard, if and only if there is an NP-complete problem L that is polynomial time Turing-reducible to H. An example of an NP-hard problem is the optimization problem of finding the least-cost cyclic route through all nodes of a weighted graph. This is commonly known as the traveling salesman problem.

In a simplistic example scenario discussed below, each object has a single replica and the storage containers in the storage system are defined to have the same size. In this example, the placement problem is modeled to a k-way weighted graph partitioning problem, where the graph is divided into k disjoint parts such that the parts have approximately equal weight. Please note, however, that in a more complex scenario, the container sizes may vary and multiple copies of one or more objects may exist.

In accordance with one embodiment, a placement is defined as "self-contained degree M placement for objects u and v", if there are M−1 objects $w_1, w_2, \ldots, w_{M-1}$ that create a directed path from u to v, and there is a storage container that includes u, v and the M−1 objects $w_1, w_2, \ldots, w_{M-1}$. Thus, by way of example, a placement is defined to be "self-contained degree 1 placement for objects u and v", if there is a link between u and v and there is a storage container that includes both objects.

As another example, a placement is defined to be "self-contained degree 2 placement for objects u and v", if there is an object $w_1$ such that there is a link from u to $w_1$ and from $w_1$ to v, and there is a storage container that includes the three objects u, $w_1$, v. Accordingly, in more general terms, a placement is "self-contained degree M placement" if it is self-contained degree i for some i<=M, and for some pair of objects u and v that have a directed path between them, i.e., a placement in which paths of up to length M are considered.

In a placement that is self-contained degree M, the weight is the sum of the weights of the unique directed paths from u to v for which there is a self-contained degree i placement for some i<=M. It is noteworthy that, depending on implementation, in one embodiment, the weight of a directed path is a function of the weights on the links in the path plus a factor that decreases the weight as the path gets longer.

Referring to FIG. 1, by way of a non-limiting example, four objects u1, u2, u3 and u4 are illustrated as having the same size with links (i.e., associations) that, in this example scenario, are equally important (i.e., have the same weight). In this example, the weight of a path with one edge is 1, and the weight of a path with two edges is 0.5, as an indication that the relationship between objects connected in a longer path is weaker than the relationship between objects that are connected via a relatively shorter path.

Assume, for example, that we want to place the objects into two containers, where each container has a capacity for three objects. The placement {u1,u2,u3} and {u3,u4} represents a self-contained placement of degree 1 with weight of 3. Whereas, the placement {u1,u3,u4} and {u2,u3,u4} represents a self-contained placement of degree 2 with a weight of 4 (i.e., 3+0.5+0.5).

In one embodiment, a constraint satisfaction model for a placement problem may be defined as follows:

Given:

Set of objects with known sizes that have weight-directed links or weight-directed paths Number of storage containers K and the size of each container (SCi)

Maximum number of required copies $u_L$ for each object u

The desired self-containment placement degree M

Find:

A placement (partition) $V_1, \ldots, V_K$ of V for K storage containers, where:

the sum of the object sizes in each container i doesn't exceed the container size SCi the number of copies for each object u doesn't exceed $u_L$ the placement weight is optimized to the highest weight of a self-contained placement degree M In the following, exemplary methods for placing data objects in K storage containers are provided with additional detail.

In one embodiment, in order to find the most optimum placement for data objects stored in a plurality of storage containers, the associations (i.e., links or edges) among the data objects and the respective weights (i.e., importance) for the associations between the data objects are defined. Depending on implementation, the associations and the corresponding weights may be determined based on metadata associated with the data objects. Example associations that can be considered are:

Representation Information—if an object defines how to use another object, then there is a link between the two Collection—two objects that belong to the same collection, have a link between the two Context—two objects that share the same context, have a link between two Access Pattern—objects that are generally accessed together have links among them Storlet (compute module)—if a storlet object is executed on another object, then there is a link between the two; e.g. (1) one object has a link to a second object that represents the fixity module that will run on that first object, (2) one object has a link to a second object that represents the transformation module that will run on that first object.

Offline Placement—Referring to FIGS. 2A and 2B, in accordance with an embodiment implemented for a self-contained degree 1 placement scenario, a linear programming or more specifically a Binary Integer Programming (BIP) problem is defined. The objective function is to maximize the self-contained placement of related objects in a plurality of storage containers with known capacities (i.e., sizes), while minimizing the placement of multiple copies of the same object, according to the following:

Objective Function:
Maximize:

$$\sum_{i=1}^{K} \sum_{\forall u,v \in V} [w(uv_i)x(uv_i) - p(u)y(u_i) - p(v)y(v_i)]$$

wherein $w(uv_i)$ represents the weight of the directed edge from u to v in container i and wherein p(u) represents the penalty for using a copy of node (object) u. The penalty is proportional to the size of u but is smaller than w(uv) for all edges connected to u and has the same value regardless of the storage container in which the node resides.

Variables:

$$x(uv_i) = \begin{cases} 1 & \text{if the edge } uv \text{ is selected in storage container } i \\ 0 & \text{otherwise} \end{cases}$$

$$y(u_i) = \begin{cases} 1 & \text{if node } u \text{ is selected in storage container } i \\ 0 & \text{otherwise} \end{cases}$$

Constraints:
1. The sum of the nodes' sizes (objects' sizes) in container i, is not larger than the given size of storage container i which is denoted SCi.

$$\sum_{\forall u \in V} s(u)y(u_i) \leq SCi \text{ for } i = 1, \ldots, K$$

2. For storage containers, one edge between nodes u and v is selected, so there is no attempt to add profit by adding already used edges instead of unused edges. The used edges are unique.

$$\sum_{i=1}^{K} x(uv_i) \leq 1 \text{ for all } u, v \in V \text{ for which } w(uv) > 0$$

3. If an edge is selected in storage container i, then so are the nodes connected to that edge (incident vertices).

$2x(uv_i) - y(u_i) - y(v_i) \leq 0$ for i=1 . . . K and
for all u, v ∈ V

4. The number of copies of an object is at least 1 and doesn't exceed the defined maximum number of copies $U_L$.

$$1 \leq \sum_{i=1}^{K} y(u_i) \leq u_L \text{ for all } u \in V$$

5. Variables x and y have binary values. Additionally, if we want to force an object u' to be placed in a specific storage container i', we can add a constraint that $y(u'_{i'})=1$.

$x(uv_i), y(u_i) \in \{0,1\}$ for all u, v ∈ V

Referring to FIG. 3, for the more general degree M scenario, in one embodiment, additional constraints (2) and (3.1), (3.2) . . . (3.M) may be added. The path between objects "u" and "v" of length "j" in container "i" may be defined as the variable:

$$x_j(uv_i) = \begin{cases} 1 & \text{if there is a directed path of length } j \text{ in storage container } i \\ 0 & \text{otherwise} \end{cases}$$

The weight of the path of length "j" from "u" to "v" in storage container "i" may be defined as coefficient:
$w_j(uv_i)$=a function of the weights on the edges in the path plus a factor that decreases the weight as the path gets longer.
Objective Function:

$$\text{maximize} \sum_{i=1}^{K} \sum_{\forall u,v \in V} \left[ \sum_{j=1}^{M} w_j(uv_i)x_j(uv_i) - p(u)y(u_i) - p(v)y(v_i) \right]$$

As shown, the constraints in the self-contained degree M placement scenario may include:
(2) One directed path between nodes u and v is selected, so there is no attempt to add profit by adding already used directed paths instead of unused directed paths. The used directed paths are unique.

$$\sum_{i=1}^{K} \sum_{j=1}^{M} x_j(uv_i) \leq 1 \text{ for all } u, v \in V \text{ for which } w_j(uv) > 0$$

(3.1) If an edge is selected in storage container i, then so are the nodes connected to that edge (incident vertices).

$2x_j(uv_i)-y(u_i)-y(v_i) \leq 0$ for i=1, . . . , K and
for all u, v ∈ V
(3.2) If a path of length 2 (with 2 edges) is selected in storage container i, then so are all the nodes in this path.

$3x_2(uv_i)-y(u_i)-y(w^1_i)-y(v_i) \leq 0$ for i=1, . . . , K and
for all u, v ∈ V
(3.M) If a path of length M (with M edges) is selected in storage container i, then so are all the nodes in this path.

$(M+1)x_M(uv_i)-y(u_i)-y(w^1_i)- \ldots -y(w^{M-1}_i)-y(v_i) \leq 0$

Please note that constraint (2) above and as shown in FIG. 3, replaces the constraint (2) from the degree 1 scenario illustrated in FIG. 2A. Also, constraints (3.1), (3.2), . . . , (3.M) are M constraints that replace constraint (3) in FIG. 2A. The other constraints for the scenario shown in FIG. 3 are the same as those shown in FIG. 2A, (i.e., constraints (1), (4), (5)) remain the same) but are not shown in FIG. 3 for brevity.

Based on the above, in one embodiment, a Binary Integer Programming (BIP) problem may be defined and solved using a BIP solver, for example. The solver will provide a set of $y(u_i)$ flagged with Boolean values (e.g., set=1, unset=0), for example, wherein an object u with corresponding $y(u_i)$ set to 1, indicates that object u is to be stored in container i.

Semi-online Placement—In one embodiment, the most optimal placement is made when new objects arrive, preferably, without changing the placement of objects that have been already placed, with the exception of instances when changing the placement of certain objects is highly desirable (i.e., results in better placement). In such a case (i.e., the semi-online placement), the placement of selected objects is updated as defined by one or more constraints, for example. Other modifications of this latter scheme are also possible, depending on the storage system configuration and placement goals.

For example, in one embodiment, the data objects to be placed in the storage system may be known prior to initiating the placement and some objects may be stored in storage containers in a non-optimal manner. In this scenario, it would be desirable to find an optimized self-contained placement that reduces the number of objects moved from one container to another. In this case (i.e., the semi-online self-contained placement), the coefficient $w_j(uv_i)$ is set to have a larger weight for objects u and v that are already placed in storage container i and have a directed path of length j from u to v. Then, the offline placement scheme defined earlier is applied to optimize placement.

Online Placement—In one embodiment, a greedy solution implemented based on the semi-online placement noted above may be applied. In such a case, when a new object u arrives, the following is iteratively performed:
  1. The best self-contained placement for u is found, given the current placement and allowed number of copies for u, by examining a constant number of possibilities:

$$\sum_{i=1}^{U_L} \binom{K}{i}$$

2. If n objects were placed since last rearrangement, then the semi-online self-contained placement solution for the objects is found and a rearrangement is performed according to the solution.

In one embodiment, process 1 above may be omitted and n objects may be stored in a staging area. Then process 2 may be performed to place the n objects, using the aforementioned semi-online self-contained placement scheme.

Accordingly, one or more methods that include implementing a model for self-contained placement and formulating the associated cost or target functions and constraints are provided. The model equations present an optimization problem that may be solved to optimize (e.g., maximize or minimize) costs based on a defined cost function.

It is noteworthy that the details of the exemplary placement schemes and the linear programming solution discussed above are provided by way of example. Other optimization methods may be employed and applied in a variety of data storage context, without detracting from the scope of the claimed subject matter. To illustrate, in the following, a few practical examples that are applicable to existing commercial and business systems are provided.

Fixed Content Storage Systems—A healthcare fixed content storage system may be used in, for example, a hospital that has a data bucket for every ward. That is, for example, a data bucket may be assigned for pediatrics ward, a data bucket for surgery ward, a data bucket for gynecological ward, etc. The hospital stores the data in a fixed content storage service where each data bucket has several replicas in geographically dispersed data centers. Furthermore, the hospital has clients (e.g., doctors, advisors, researchers and patients) around the globe that may need to access the data.

In one embodiment, the above noted placement methods may be used to place the data buckets in the various data centers such that locality is best maintained. In other words, the optimal placement goal would be to provide a copy (e.g., a replica) of the data that the client needs in a data center that is geographically closest to the client. To accomplish this goal, the above placement methods may be used as follows. A first data object that represents a "ward object" may be instantiated for each ward that its size is the amount of storage required for that ward and its number of copies is the number of its required replicas. Weighted links are created between "ward objects" that represent related wards (e.g., an association may be established between the pediatric ward and the labor and delivery wards).

In one embodiment, a second data object that represents a "client object" may be instantiated for each client and data center the client accesses. The client object may, for example, have a fixed size of 1K bytes and one copy. As such, if a doctor X working for the hospital accesses data in a data center A in a first locality 80% of the time and accesses another data center B in a second locality 20% of the time, for example, then two client objects (e.g., XA and XB) may be implemented. Weighted links between the various client objects and ward objects may be established based on the level of data accessed.

For example, the weight between client object XA and the ward object "pediatrics ward" may be higher than the weight between the client object XB and ward object "pediatrics ward", if the doctor is most of the time in the first locality A, assuming all other parameters that influence the weight are not as influential in assigning weights to the relationships between the noted objects. The clients objects to be placed in the storage container A that is associated with the data center in locality A are assigned to 1 if and only if they represents a client in data center A. Thus, the following constraint applies:

$$y(u_A) = \begin{cases} 1 & \text{if object } u \text{ represents a client in data center } A \\ 0 & \text{otherwise} \end{cases}$$

Accordingly, the solution to the above exemplary model will provide information on how to place the respective data objects in the data centers, where locality to the client is the target factor. Another variation of this example may include a healthcare fixed content store in which several buckets for each patient's data are kept. For example, a data bucket may be used to store patient vaccination and periodic exam records, another data bucket may be used to store patient psychology treatment records, and another data bucket to store patient medication history records, etc.

eMail Archive—In an email archive storage system, an email thread may be a collection of several interrelated objects. The email thread may include messages; and each message may include attachments. In some embodiments, the archive is stored on storage tapes and each data object has several replicas. It would be desirable to place the data objects on storage tapes so that on access a minimal number of tapes are mounted. This scheme would improve latency and reduce power consumption in the storage system.

The above placement methods may be used as follows. We create an object for each thread, an object for each message and an object for each attachment. Weighted links may be then established between the objects. Note that the same attachment may appear in several messages. The solution to this model will indicate which object replica to place on which tape.

Cloud Computing—In a cloud computing environment with multiple clusters, there may be virtual machines (VM) and buckets of data that the VMs need to process. The VMs may have several replicas and some VMs may work in conjunction. Also, multiple VMs may access the same data bucket. Furthermore, the VM may be running on a host in the cluster where the VM is placed. It would be desirable to place the VMs and the data buckets in the various clusters, so that data computation is performed close to the data.

To accomplish the above objective, the above placement methods may be used as follows. We create an object for each VM and an object for each data bucket. Weighted links may be established between VMs that operate in conjunction. Weighted links may be also established between VMs and the data buckets the VMs process. The solution to the model will indicate which VM replica and which data bucket to place on which cluster.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
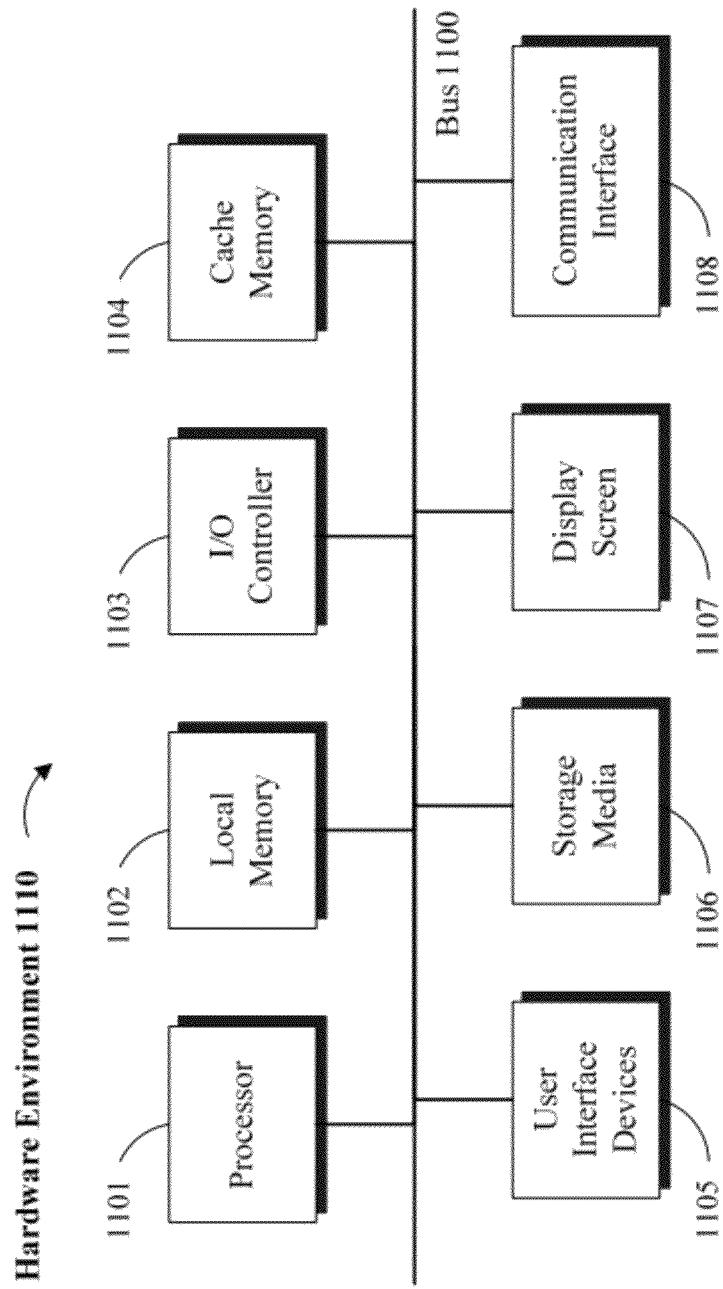
FIGS. 4A and 4B are block diagrams of hardware and software environments in which the disclosed systems and methods may operate, in accordance with one or more embodiments.
Figure 4B:
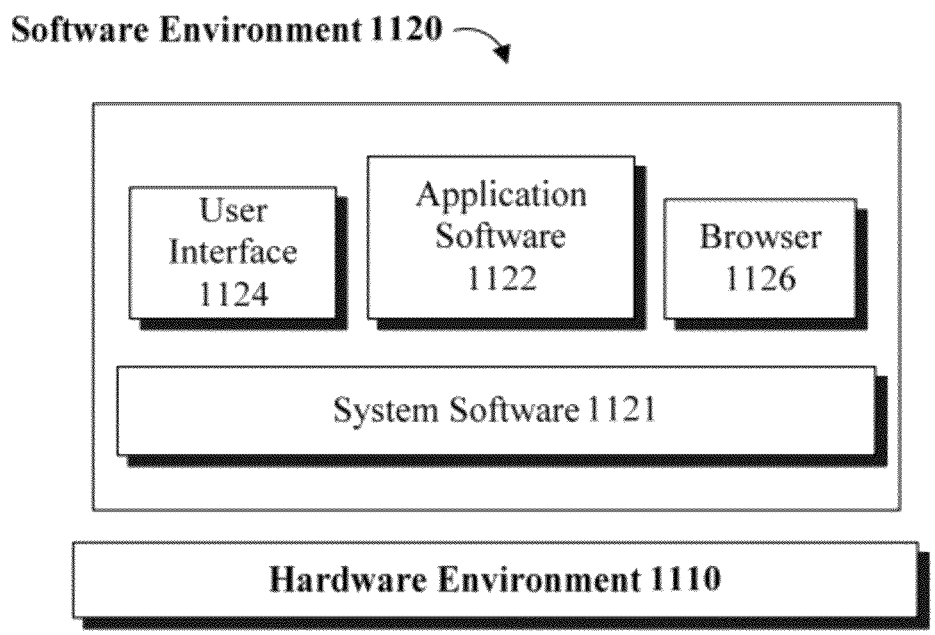

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method implemented for execution on one more processors for optimal data storage, the method comprising:
    storing data objects that are most closely related in a storage container by modeling a constraint satisfaction problem for placement of said data objects in one or more storage containers,
    wherein the constraint satisfaction problem defines a self-contained placement degree for placement of the data objects, and accounts for penalties for placing multiple copies of the same data object in the one or more storage containers,
    wherein a weight is assigned to a path connecting two data objects u and v, and a self-contained placement degree M is defined for the data objects u and v where there is a storage container that includes u, v and M−1 data objects $w_1, w_2, \ldots w_{M-1}$ that create a directed path from u to v,
    wherein output of a solver that solves the constraint satisfaction problem provides information about the data objects that are to be placed in the one or more storage containers,
    wherein the constraint satisfaction problem is defined as follows:
    Given:
        a set of data objects with known sizes that have weight-directed links or weight-directed paths;
        number of storage containers K and the size of each container (SCi);
        maximum number of required copies $u_L$ for each object u;
        desired self-containment placement degree M;
    Find a placement V1, ..., VK of V for K storage containers, where:
        sum of the object sizes in each container i doesn't exceed the container size SCi;
        number of copies for each object u doesn't exceed $u_L$;
    such that placement weight is optimized to the highest weight of a self-contained placement degree M.

2. The method of claim 1 wherein the storage container comprises at least one of a mountable data storage unit, a file system, a tape, a block device, a stream device, an object store, or a data bucket in a cloud storage.

3. The method of claim 1, wherein $x_j(UV_i)$ represents a path of length "j" between objects U and V in a storage container i, wherein output of a solver that solves the constraint satisfaction problem provides information about the data objects that are to be placed in the one or more storage containers, wherein variable x(UVi) is a Boolean variable that indicates whether an edge UV is included in a storage container i and variable y(Ui) is a Boolean variable that indicates whether an object U is included in the storage container i, and wherein the result of the solver includes multiple sets, where each set represents a storage container and values included in that set represent the data objects or copies of data objects that are to be placed in the one or more storage containers.

4. The method of claim 3 wherein the result of the solver is used to rearrange placement for the data objects in a data storage system so as to optimize data access and retrieval to improve data security and fault tolerance.

5. The method of claim 4 further comprising analyzing data previously placed in the one or more storage containers and using a placement model used for modeling the constraint satisfaction problem to rearrange placement of the data objects in the most optimal way based on one or more identified constraints in the constraint satisfaction problem.

6. The method of claim 5 further comprising making the most optimal placement possible once receiving new data objects for placement in the one or more storage containers, without changing the placement of objects that have been already stored and leaving it to a later time to perform a placement on the data objects placed in the one or more storage containers.

7. The method of claim 5 further comprising making the most optimal placement possible when new data objects are received for placement without changing the placement of data objects that have been already placed, other than instances when changing the placement of some data objects is highly desirable.

8. The method of claim 1 wherein the constraint satisfaction problem is utilized to maximize self-contained placement of related data objects in the one or more storage containers with known capacities, while minimizing the placement of multiple copies of the same data object, according to the following:

Objective Function:

Maximize:

$$\sum_{i=1}^{K} \sum_{\forall u,v \in V} [w(uv_i)x(uv_i) - p(u)y(u_i) - p(v)y(v_i)]$$

Variables:

$$x(uv_i) = \begin{cases} 1 & \text{if the edge } uv \text{ is selected in storage container } i \\ 0 & \text{otherwise} \end{cases}$$

Constraints:

the sum of the data object sizes in container i, is not larger than the given size of storage container i which is denoted SCi;

$$\sum_{\forall u \in V} s(u)y(u_i) \leq SCi \text{ for } i = 1, \ldots, K$$

for storage containers, one edge between nodes u and v is selected, so there is no attempt to add profit by adding already used edges instead of unused edges, the used edges are unique;

$$\sum_{i=1}^{K} x(uv_i) \leq 1 \text{ for all } u, v \in V \text{ for which } w(uv) > 0$$

if an edge is selected in storage container i, then so are the nodes connected to that edge (incident vertices);

$$2x(uv_i) - y(u_i) - y(v_i) \leq 0 \text{ for } i = 1 \ldots K \text{ and for all } u, v \in V$$

number of copies of an object is at least 1 and doesn't exceed the defined maximum number of copies UL;

$$1 \leq \sum_{i=1}^{K} y(u_i) \leq u_L \text{ for all } u \in V$$

variables x and y have binary values; and wherein if an object u' is placed in a specific storage container i', add a constraint that y(u'i')=1;

$$x(uv_i), y(u_i) \in \{0,1\}$$

for all u, v∈V.

9. The method of claim 8, where in a general degree M scenario, path between objects "u" and "v" of length "j" in container "i" may be defined as the variable:

$$x_j(uv_i) = \begin{cases} 1 & \text{if there is a directed path of length } j \text{ in storage container } i \\ 0 & \text{otherwise} \end{cases}$$

10. The method of claim 9, wherein the weight of the path of length "j" from "u" to "v" in storage container "i" may be defined as coefficient:

wj(uvi)=a function of the weights on the edges in the path plus a factor that decreases the weight as the path gets longer.

11. The method of claim 10 wherein the objective function is defined as:

$$\text{maximize} \sum_{i=1}^{K} \sum_{\forall u,v \in V} \left[ \sum_{j=1}^{M} w_j(uv_i)x_j(uv_i) - p(u)y(u_i) - p(v)y(v_i) \right].$$

12. The method of claim 11 wherein the constraints in the degree M scenario include:

one directed path between nodes u and v is selected, so there is no attempt to add profit by adding already used directed paths instead of unused directed paths, the used directed paths are unique $$\sum_{i=1}^{K}\sum_{j=1}^{M} x_j(uv_i) \leq 1 \text{ for all } u, v \in V \text{ for which } w_j(uv) > 0.$$

13. The method of claim 12 wherein the constraints in the degree M scenario further include:
if an edge is selected in storage container i, then so are the nodes connected to that edge (incident vertices)

$$2x_1(uv_i) - y(u_i) - y(v_i) \leq 0 \quad \begin{array}{l} \text{for } i = 1, \ldots, K \text{ and} \\ \text{for all } u, v \in V. \end{array}$$

14. The method of claim 13 wherein the constraints in the degree M scenario further include:
if a path of length 2 is selected in storage container i, then so are all the nodes in this path $$3x_2(uv_i) - y(u_i) - y(w_i^1) - y(v_i) \leq 0 \quad \begin{array}{l} \text{for } i = 1, \ldots, K \text{ and} \\ \text{for all } u, v \in V \end{array}$$

if a path of length M is selected in storage container i, then so are all the nodes in this path $$(M+1)x_M(uv_i) - y(u_i) - \ldots - y(w^{M-1}_i) - y(v_i) \leq 0.$$

15. A computing system for optimal data storage, the system comprising:
one or more processors;
a logic unit for storing data objects that are most closely related in a storage container by modeling a constraint satisfaction problem for placement of said data objects in one or more storage containers,
wherein the constraint satisfaction problem defines a self-contained placement degree for placement of the data objects, and accounts for penalties for placing multiple copies of the same data object in the one or more storage containers,
wherein a weight is assigned to a path connecting two data objects u and v, and a self-contained placement degree M is defined for the objects u and v where there is a storage container that includes u, v and M−1 objects $w_1$, $w_2$, ..., $w_{M-1}$ that create a directed path from u to v,
wherein output of a solver that solves the constraint satisfaction problem provides information about the data objects that are to be placed in the one or more storage containers,
wherein the constraint satisfaction problem is defined as follows:
Given:
a set of data objects with known sizes that have weight-directed links or weight-directed paths;
number of storage containers K and the size of each container (SCi);
maximum number of required copies $u_f$ for each object u;
desired self-containment placement degree M;
Find a placement V1, ..., VK of V for K storage containers, where:
sum of the object sizes in each container i doesn't exceed the container size SCi;
number of copies for each object u doesn't exceed $u_L$;
such that placement weight is optimized to the highest weight of a self-contained placement degree M.

16. The system of claim 15 wherein the storage container comprises at least one of a mountable data storage unit, a file system, a tape, a block device, a stream device, an object store, or a data bucket in a cloud storage.

17. The system of claim 15, wherein xj(UVi) represents a path of length "j" between objects U and V in a storage container i, wherein output of a solver that solves the constraint satisfaction problem provides information about the data objects that are to be placed in the one or more storage containers, wherein variable x(UVi) is a Boolean variable that indicates whether an edge UV is included in a storage container i and variable y(Ui) is a Boolean variable that indicates whether an object U is included in the storage container i, and wherein the result of the solver includes multiple sets where each set represents a storage container and values included in that set represent the data objects or copies of data objects that are to be placed in the one or more storage containers.

18. A computer program product comprising a non-transient computer readable storage medium having a computer readable program, wherein the computer readable program when executed on a computer causes the computer to:
store data objects that are most closely related in a storage container by modeling a constraint satisfaction problem for placement of said data objects in one or more storage containers,
wherein the constraint satisfaction problem defines a self-contained placement degree for placement of the data objects, and accounts for penalties for placing multiple copies of the same data object in the one or more storage containers,
wherein a weight is assigned to a path connecting two data objects u and v, and a self-contained placement degree M is defined for the objects u and v where there is a storage container that includes u, v and M−1 objects $w_1$, $w_2$, ..., $w_{M-1}$ that create a directed path from u to v,
wherein output of a solver that solves the constraint satisfaction problem provides information about the data objects that are to be placed in the one or more storage containers,
wherein the constraint satisfaction problem is defined as follows:
Given:
a set of data objects with known sizes that have weight-directed links or weight-directed paths;
number of storage containers K and the size of each container (SCi);
maximum number of required copies $u_L$ for each object u;
desired self-containment placement degree M;
Find a placement V1, ..., VK of V for K storage containers, where:
sum of the object sizes in each container i doesn't exceed the container size SCi;
number of copies for each object u doesn't exceed $u_L$;
such that placement weight is optimized to the highest weight of a self-contained placement degree M.

19. The computer program product of claim 18 wherein the storage container comprises at least one of a mountable data storage unit, a file system, a tape, a block device, a stream device, an object store, or a data bucket in a cloud storage.

20. The system of claim 18, wherein xj(UVi) represents a path of length "j" between objects U and V in a storage container i, wherein output of a solver that solves the constraint satisfaction problem provides information about the data objects that are to be placed in the one or more storage containers, wherein variable x(UVi) is a Boolean variable that indicates whether an edge UV is included in a storage container i and variable y(Ui) is a Boolean variable that indicates whether an object U is included in the storage container i, and wherein the result of the solver includes multiple sets where each set represents a storage container and values included in that set represent the data objects or copies of data objects that are to be placed in the one or more storage containers.

21. The computer program product of claim 20 wherein the result of the solver is used to rearrange placement for the data objects in a data storage system so as to optimize data access and retrieval to improve data security and fault tolerance.

\* \* \* \* \*